United States Patent
Peng et al.

(10) Patent No.: US 11,721,194 B2
(45) Date of Patent: Aug. 8, 2023

(54) INDOOR POSITIONING SYSTEM

(71) Applicant: NATIONAL CHIN-YI UNIVERSITY OF TECHNOLOGY, Taichung (TW)

(72) Inventors: Cheng-Yu Peng, Taichung (TW); Dwen-Chen Wu, Taichung (TW)

(73) Assignee: NATIONAL CHIN-YI UNIVERSITY OF TECHNOLOGY, Taichung (TW)

( * ) Notice: Subject to any disclaimer, the term of this patent is extended or adjusted under 35 U.S.C. 154(b) by 0 days.

(21) Appl. No.: 17/700,446

(22) Filed: Mar. 21, 2022

(65) Prior Publication Data

US 2022/0319298 A1 Oct. 6, 2022

(30) Foreign Application Priority Data

Mar. 31, 2021 (TW) .................................. 110111885

(51) Int. Cl.
*G08B 1/08* (2006.01)
*G08B 21/18* (2006.01)
*G06K 7/14* (2006.01)

(52) U.S. Cl.
CPC ......... *G08B 21/182* (2013.01); *G06K 7/1404* (2013.01)

(58) Field of Classification Search
CPC .. G08B 21/182; G08B 21/22; G08B 13/2417; G06K 7/1404; G01S 5/02; G01S 5/0226; G01S 5/0295

USPC ..................................... 340/539.1
See application file for complete search history.

(56) References Cited

U.S. PATENT DOCUMENTS

| | | | | |
|---|---|---|---|---|
| 11,514,766 B1 * | 11/2022 | McDaniel | .......... | G08B 13/2485 |
| 2007/0001854 A1 * | 1/2007 | Chung | .......... | G08B 13/02 340/572.1 |
| 2014/0240088 A1 * | 8/2014 | Robinette | .......... | G08B 21/0219 340/5.61 |

* cited by examiner

*Primary Examiner* — Tai T Nguyen
(74) *Attorney, Agent, or Firm* — Muncy, Geissler, Olds & Lowe, P.C.

(57) ABSTRACT

An indoor positioning system, for detecting a position of a target object located in a containing body, includes a tracking label, a plurality of positioning label groups, and a scanning device. The tracking label is disposed on the target object. Each positioning label groups is disposed on the containing body and has a plurality of label units. Each label unit defines a positioning interface, which forms a plurality of areas of the containing body. The scanning device senses and reads the tracking label and each label unit of each positioning label group. The scanning device obtains the positioning interface in which the tracking label is located through an analysis computation according to a signal relationship between the tracking label and each label unit, thereby identifying the positioning interface to obtain one of the areas of the target object in the containing body.

8 Claims, 6 Drawing Sheets

INDOOR POSITIONING SYSTEM

BACKGROUND OF THE INVENTION

1. Field of the Invention

The present invention relates to positioning related fields, and more particularly, to an indoor positioning system for searching the target object indoor.

2. Description of the Related Art

A conventional positioning system, such as a global positioning system (GPS), applies the signals received by a GPS chip from at least three of twenty-four GPS satellites in the space (known as trilateration), so as to confirm the location and altitude of the GPS chip for completing the positioning operation. The GPS chip can practically carry out an accurate positioning process; however, it requires a huge computation capability (such as using a processor with high computation and high-power consumption) to execute the aforementioned accurate positioning process.

However, the GPS system is mainly applied in an outdoor space. Although it can still be applied for indoor positioning, in the indoor application, the accuracy of indoor positioning is significantly lower than that of outdoor positioning, due to the limitations of environmental factor of the GPS chip (such as being covered by building).

To fulfill the requirement of indoor positioning, wireless indoor positioning techniques are developed, including Wi-Fi fingerprinting technique, lower power consumption Bluetooth positioning technique through the received signal strength indication (RSSI), RFID positioning technique, ZigBee positioning technique, with algorithms such as cooperation of angle of arrival (AOA) positioning method or time difference of arrival (TDOA) positioning method, thereby executing the positioning computation.

The most commonly used positioning system mainly applies Bluetooth or Wi-Fi with RSSI positioning method However, the positioning accuracy of such methods are easily interfered by other external signals.

SUMMARY OF THE INVENTION

To improve the issues above, the present invention provides an indoor positioning system. By using the positioning label group for defining a plurality of positioning interfaces of a containing body, the present invention scans the label signal relation variations through the scanning device to acquire the interface in which the target object is located, thereby achieving an efficient and accurate indoor positioning effect.

For achieving the aforementioned objectives, an indoor positioning system in accordance with an embodiment of the present invention is applied for detecting a position of a target object located in a containing body, the indoor positioning system comprising:

a tracking label disposed on the target object;

a plurality of positioning label groups each disposed on the containing body, each positioning label group comprising a plurality of label units, each label unit defining a positioning interface, each positioning interface forming a plurality of areas of the containing body; and a scanning device sensing and reading the tracking label and each label unit of each positioning label group, the scanning device obtaining the positioning interface in which the tracking label is located through an analysis computation according to a signal relationship between the tracking label and each label unit, thereby identifying the positioning interface to obtain one of the areas of the containing body in which the target object is located.

With such configuration, the present invention applies the positioning label groups to define a plurality of positioning interfaces of the containing body, and the scanning device reads the variation of the signal relationship of the labels, so as to obtain the positioning interface of the target object for identifying the current position of the target object. Therefore, the present invention improves the disadvantage of identification inaccuracy of the indoor positioning operation, thereby efficiently and accurately acquiring the indoor position.

DETAILED DESCRIPTION OF THE INVENTION

Figure 1:
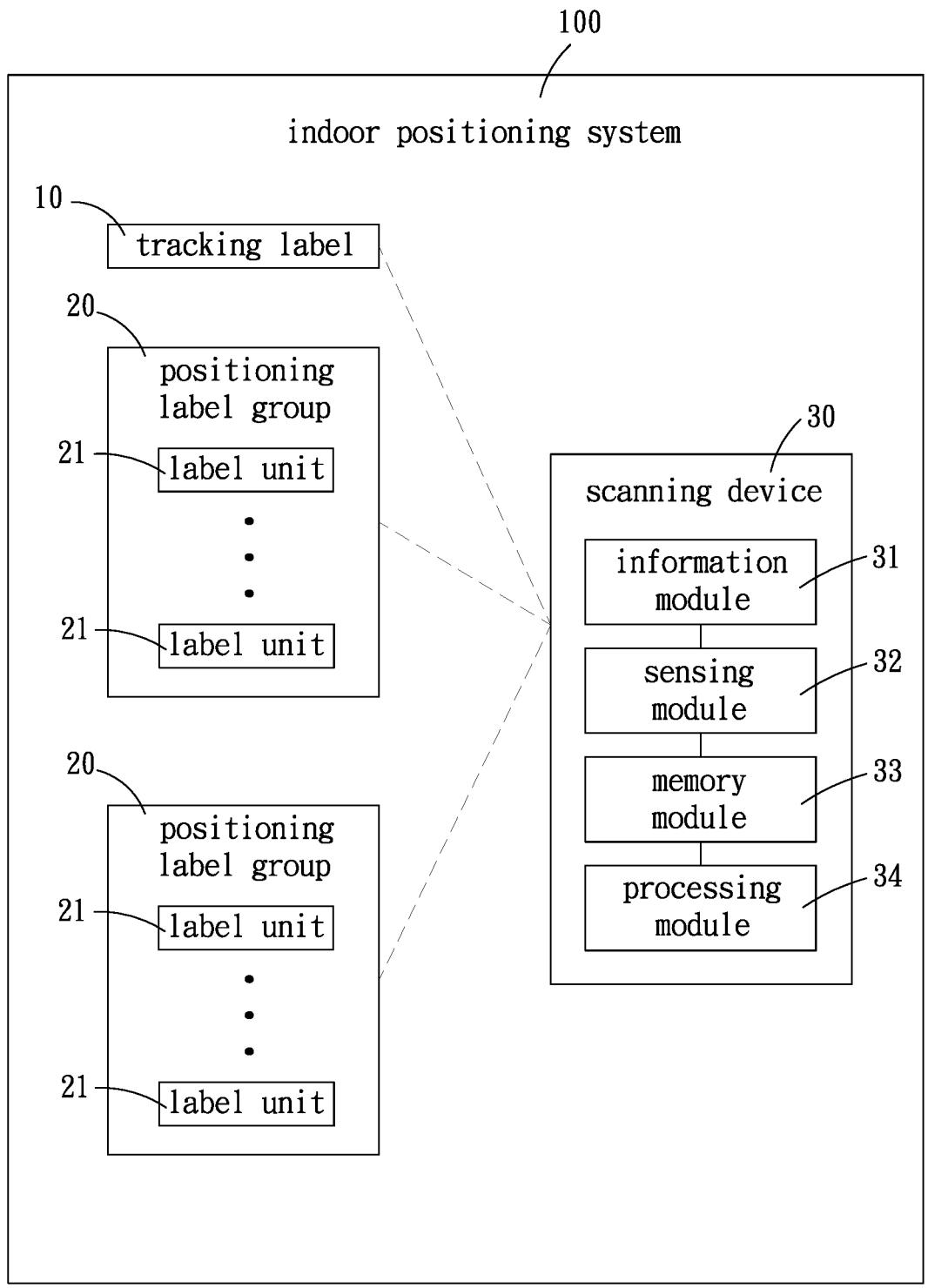
FIG. 1 is a structural block of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

The directional terms of, for example, "up", "down", "front", "rear", "left", "right", "inner", "outer", and "side" are only used herein for illustrating the relative directions shown in the drawings. Therefore, the directional terms are applied for the purpose of illustration and understanding of the present invention, instead of limiting the present invention.

Referring to FIG. 1 to FIG. 6, the present invention provides an indoor positioning system 100 for detecting a position of a target object T in a containing body C. Therein, the containing body C can be, for example but not limited to, an indoor space, a fixed carrier, or a moving carrier.

The indoor positioning system 100 comprises a tracking label 10, a plurality of positioning label groups 20, and a scanning device 30.

The tracking label 10 is disposed on the target object T. The tracking label 10 is allowed to be an active member or a passive member. When the tracking label 10 is an active member, it is able to continuously or intermittently emits a signal through a contact type energy input. When the tracking label 10 is a passive member, it is able to continuously or intermittently emits a signal after a non-contact type external energy input.

The plurality of positioning label groups 20 are disposed on the containing body C, respectively. Each positioning label group 20 comprises a plurality of label units 21, wherein each label unit 21 is allowed to be an active member or a passive member. When the label unit 21 is an active member, it is able to continuously or intermittently emits a signal through a contact type energy input. When the label unit 21 is a passive member, it is able to continuously or intermittently emits a signal after a non-contact type external energy input.

Figure 2:
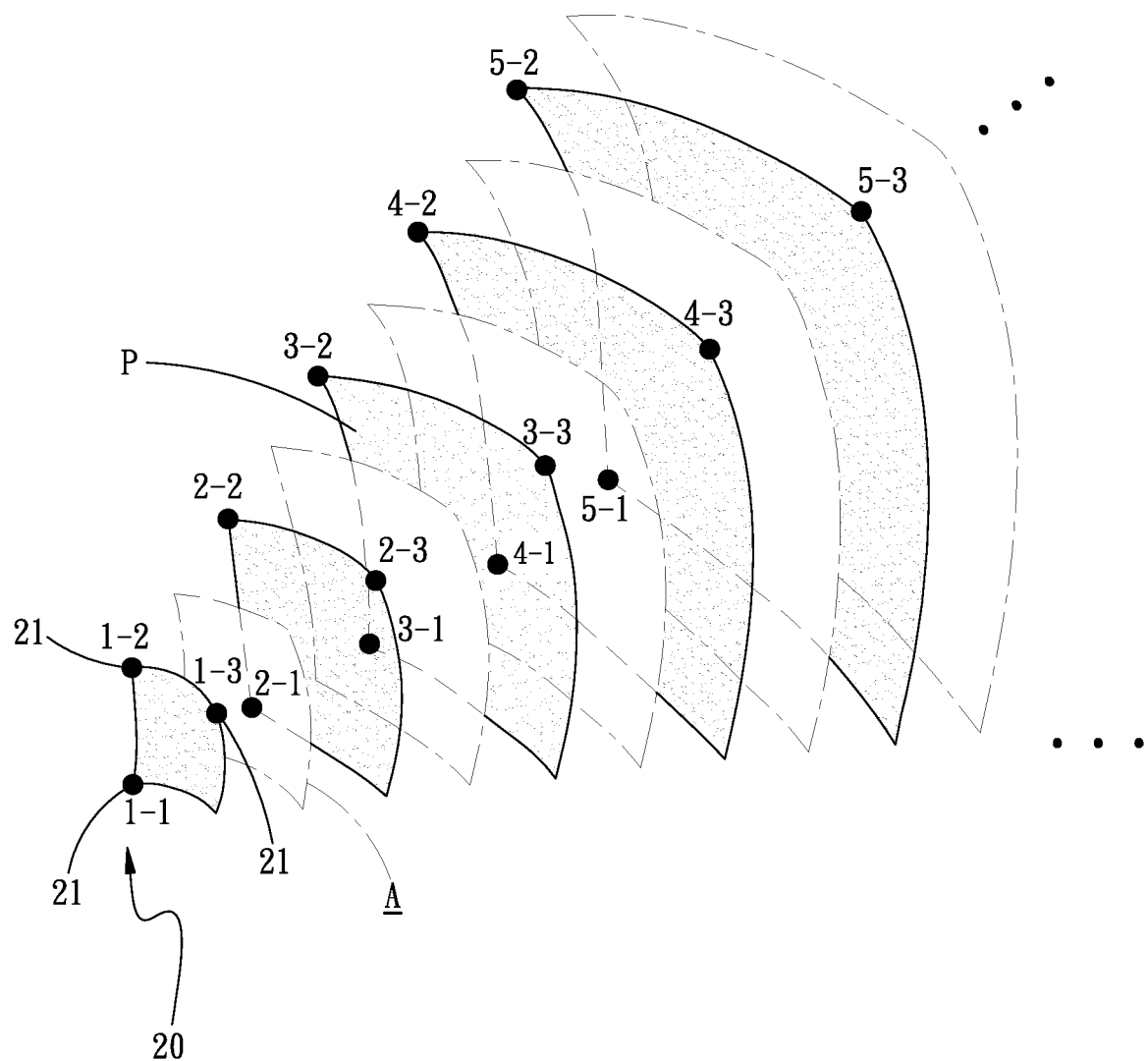
FIG. 2 is a schematic view of the present invention, illustrating each label unit defining each positioning interface.

Also, each label unit 21 defines and generates a positioning interface P, and each positioning interface P forms a plurality of areas A of the containing body C. Therein, each positioning label group 20 constructs one positioning interface P with at least three label units 21, as shown by FIG. 2. Also, the positioning interface P is not limited to a plane surface, but is able to be any interface formed of a curved surface, inclined surface, or irregular surface. In other words, the positioning interface P can be presented with, for example but not limited to, rectangular coordinates, polar coordinates, circular coordinates, or cylindrical coordinates, etc. Therefore, when the containing body C is defined with a plurality of positioning interface P by each label unit 21 of each positioning label group 20, the containing body C is allowed to be divided into a plurality of areas A. Therein, each area A can be arranged at intervals or divided by different positioning interfaces P. The forms of the area A are not limited in the present invention.

The scanning device 30 is allowed to be an electromagnetic wave energy transmitter or receiver. The scanning device 30 comprises an information module 31, a sensing module 32, a memory module 33, and a processing module 34. The information module 31 is applied for storing the exclusive information of the tracking label 10 and each label unit 21 (such as identification codes or other exclusive information for identifying different labels). Referring to FIG. 2 to FIG. 6, the exclusive information of each label unit 21 are presented as 1-1, 1-2, 1-3, 1-4, 2-1, 2-2 . . . and so on. The sensing module 32 is applied for sensing and reading the tracking label 10 and each label unit 21 of each positioning label group 20, so as to sense the signal relationship variation between the tracking label 10 and each label unit 21.

The sensing module 32 transmits the label unit 21 or tracking label 10 to the memory module 33. The memory module 33 stores the amount of each label unit 21 or the tracking label 10 reads by the sensing module 32 each time, so as to record a label amount. The processing module 34 compares the information in the sensed labels and the information in the information module 31, so as to confirm the amount of the label unit 21 or tracking label 10 read each time, and uses an analysis calculation to carry out a deviation calculation of the label amounts currently recorded by the memory module 33 and the label amounts previously recorded by the memory module 33, thereby obtaining the positioning interface P in which the tracking label 10 (target object T) is, and identifying one of the areas A of the target object T in the containing body C through the positioning interface P.

In the embodiment of the present invention, the sensing module 32 senses the tracking label 10 or each label unit 21 through a first scanning technique or a second scanning technique. The first scanning technique and second scanning technique of the sensing module 32 are explained as follows.

The sensing module 32, through the first scanning technique from any position of the containing body C, uses the energy of different transmission strengths to sense the tracking label 10 and each label unit 21 of each positioning label group 20 of different signal strengths, thereby detecting the position of the target T in the containing body C.

Figure 3:
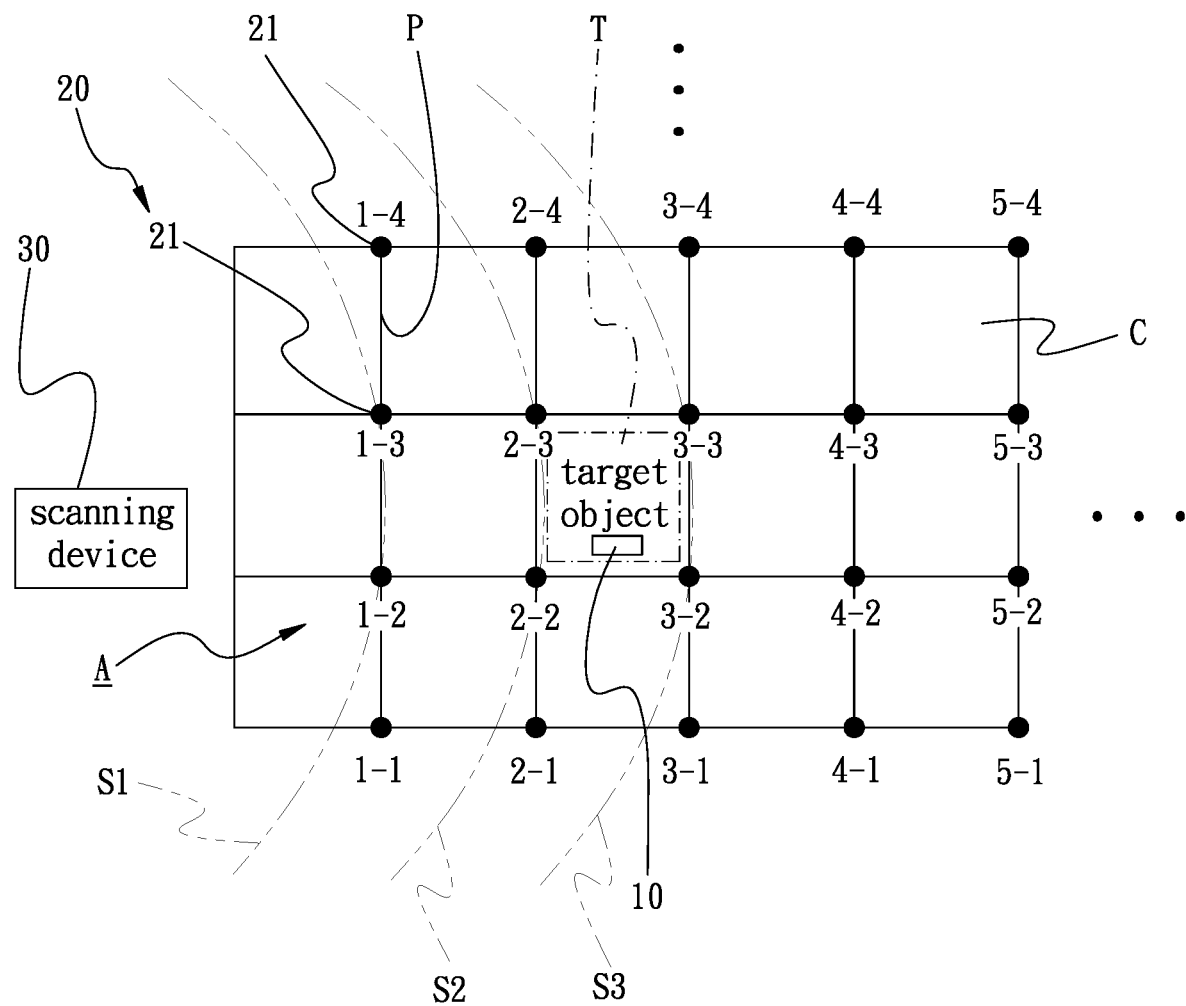
FIG. 3 is a schematic view of the positioning label group applied in the containing body which is an indoor space in accordance with an embodiment of the present invention, illustrating that the scanning device uses the first scanning technique to sense the label from one side of the indoor space.

For example, referring to FIG. 1 and FIG. 3, the positioning label groups 20 are applied in a containing body C which is an indoor space. The sensing module 32 of the scanning device 30 uses the first scanning technique to sense and read the exclusive information of different label units 21 through the energy of different transmission strengths (scanning strength S1, scanning strength S2, and scanning strength S3, respectively) from one side of the indoor space. Therein, the exclusive information of the label unit 21 read through the scanning strength S1 is 1-2 and 1-3, so that the memory 33 records the detected label amount as 2; the exclusive information of the label unit 21 read through the scanning strength S2 is 1-1, 1-2, 1-3, 1-4, 2-2, and 2-3, so that the memory 33 records the detected label amount as 6; the exclusive information of the label unit 21 read through the scanning strength S3 is 1-1, 1-2, 1-3, 1-4, 2-2, 2-3, 2-4, 3-2, and 3-3, plus the exclusive information of the tracking label 10, so that the memory 33 records the detected label amount as 11. Next, the processing module 34 subtracts the label amount in the memory module 33 read through the strength S3 from the label amount in the memory module 33 read through the strength S2, so as to obtain the exclusive information 2-1, 2-4, 3-2, and 3-3 of the tracking unit 21 and the exclusive information of the tracking label 10. Therefore, it is known that the tracking label 10 (target object T) is in the area A which is defined by the labels 21 (2-1, 2-4, 3-2, and 3-3) in the containing body C.

Figure 4:
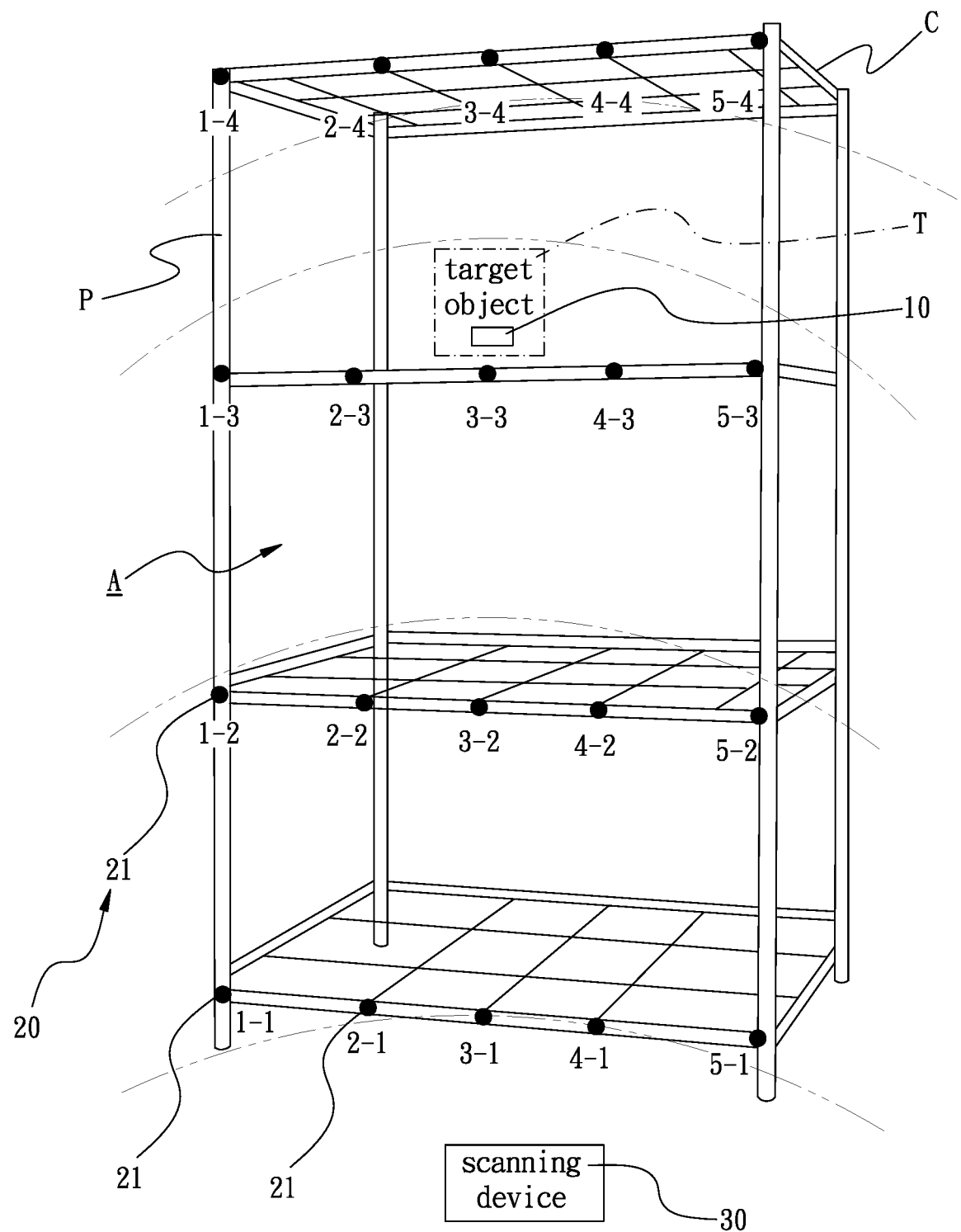
FIG. 4 is a schematic view of the positioning label group applied in the containing body which is a carrier in accordance with an embodiment of the present invention, illustrating that the scanning device uses the first scanning technique to sense the label from one side of the carrier.

For a second example, referring to FIG. 1 and FIG. 4, the positioning label groups 20 are applied in a containing body C which is a shelf. The sensing module 32 of the scanning device 30 uses the first scanning technique to sense and read the exclusive information of different label units 21 through the energy of different transmission strengths (scanning strength S1, scanning strength S2, and scanning strength S3, respectively) from one side of the shelf. Therein, the exclusive information of the label unit 21 read through the scanning strength S1 is 1-1, 2-1, 3-1, 4-1, and 5-1, so that the memory 33 records the detected label amount as 5; the exclusive information of the label unit 21 read through the scanning strength S2 is 1-1, 1-2, 2-1, 2-2, 3-1, 3-2, 4-1, 4-2, 5-1, and 5-2, so that the memory 33 records the detected label amount as 10; the exclusive information of the label unit 21 read through the scanning strength S3 is 1-1, 1-2, 1-3, 2-1, 2-2, 2-3, 3-1, 3-2, 3-3, 4-1, 4-2, 4-3, 5-1, 5-2, and 5-3, plus the exclusive information of the tracking label 10, so that the memory 33 records the detected label amount as 16. Next, the processing module 34 subtracts the label amount in the memory module 33 read through the strength S3 from the label amount in the memory module 33 read through the strength S2, so as to obtain the exclusive information 1-3, 2-3, 3-3, 4-3, and 5-3 of the tracking unit 21 and the exclusive information of the tracking label 10. Therefore, it is known that the tracking label 10 (target object T) is in the area A which is defined by the labels 21 (1-3, 2-3, 3-3, 4-3, and 5-3) in the containing body C.

The sensing module 32 of the scanning device 30, through the second scanning technique from the position of the tracking label 10 (target object T), uses the energy of the same transmission strength to define the tracking label 10 (target object T) as a concentric circle, so as to receive the tracking label 10 and each label unit 21 of each positioning label group 20 of different signal strengths in the concentric range, thereby tracking and detecting the position of the tracking label 10 (target object T) in the containing body C. In the embodiment, the second scanning technique is theoretically based on the electromagnetic interference.

Figure 5:
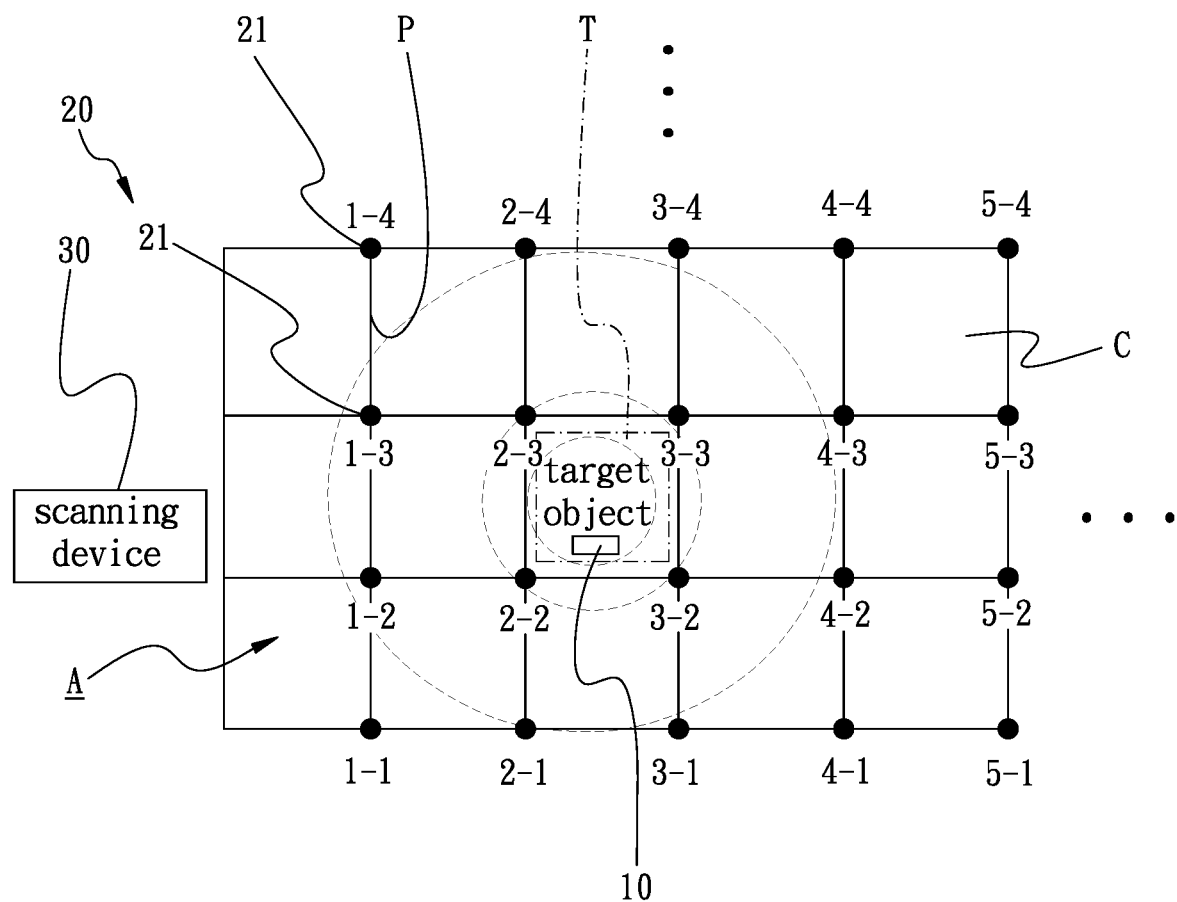
FIG. 5 is a schematic view of the positioning label group applied in the containing body which is an indoor space in accordance with an embodiment of the present invention, illustrating that the scanning device uses the second scanning technique to sense the label.

For a third example, referring to FIG. 1 and FIG. 5, the positioning label groups 20 are applied in a containing body C which is an indoor space. The sensing module 32 of the scanning device 30 uses the second scanning technique to sense and read different signal strengths (strong interference area, moderate interference are, and other area) through the energy of the same transmission strengths to read and receive the different signal strengths of the label from the concentric circle whose center is the tracking label 10, so as to define the strength of a label unit 21 without a target as the initial value, and compare the strength variation between the strength with the tracking label 10 and the strength without the tracking label 10. Therein, in the strong interference area, the scanning module 32 detects the exclusive information of the label unit 21 as 2-2, 2-3, 3-2, and 3-3 and a low value signal strength RSSI (large variation amount); in the moderate interference area, the scanning module 32 detects the exclusive information of the label unit 21 as 1-2, 1-3, 2-1, 3-1, 2-4, 3-4, 4-2, and 4-3 and a moderate value signal strength RSSI (middle variation amount); in other areas, the scanning module 32 detects the exclusive information of the label unit 21 as 1-1, 1-4, 4-1, 4-4, 5-1, 5-2, 5-3, and 5-4 and a signal strength RSSI with small variation amount. Then, the processing module 34, according to the strong variation amount of the strength of each label unit 21 searched by the sensing module 32 and an analysis calculation, identifies that the position of the tracking label 10 (target object T) is located in the area A defined by the label unit 21 (2-2, 2-3, 3-2, and 3-3).

Figure 6:
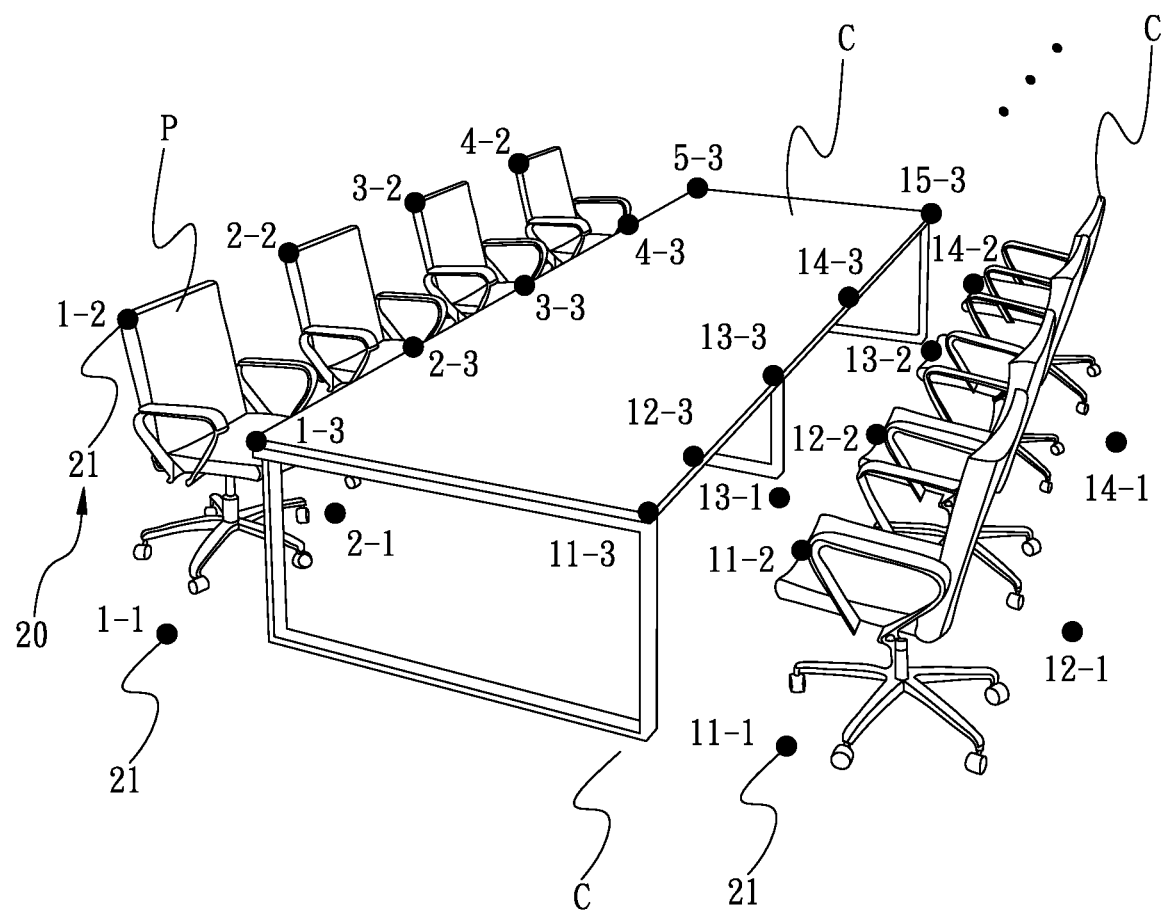
FIG. 6 is a schematic view of the positioning label group applied in the containing body which is a carrier in accordance with an embodiment of the present invention, illustrating that the carrier includes a table and chairs.

Further, referring to FIG. 1 and FIG. 6, the positioning interface P of the present invention can be formed by any combinations through the positioning label groups 20. In the embodiment, the positioning label groups 20 are applied in a containing body C which includes a table and chairs. The label unit 21 is allowed to be disposed on a fixed carrier or a moving carrier. When the label unit 21 is disposed on a fixed carrier such as the ground surface, with the exclusive information of each label unit 21 being 1-1, 2-1, 3-1, 11-1, 12-1, 13-1 . . . and so on, the area A defined by the positioning interface P defined by the label units 21 is the ground surface area. When the label unit 21 is disposed on a fixed carrier such as a table surface, with the exclusive information of each label unit 21 being 1-3, 2-3, 3-3, 11-3, 12-3, 13-3 . . . and so on, the area A defined by the positioning interface P defined by the label units 21 is the table surface area. When the label unit 21 is disposed on a moving carrier such as a sliding chair, with the exclusive information of each label unit 21 being 1-2, 2-2, 3-2, 11-2, 12-2, 13-2 . . . and so on, the area A defined by the positioning interface P defined by the label units 21 is the sliding chair area. Accordingly, the positioning interface P defined by the label units 21 (1-3, 2-3, 3-3, 11-3, 12-3, 13-3 . . . and so on, plus 1-1, 2-1, 3-1, 11-1, 12-1, 13-1 . . . and so on) disposed on the table surface and the ground surface is defined as a same positioning label group 20. Therefore, the present invention achieves a wide range of forms of the positioning surface P and the areas A defined by the positioning label groups 20.

In addition, in an embodiment of the present invention, a plurality of target objects T are allowed to exist in the same containing body C. When the processing module 34 of the scanning device 30 identifies a plurality of target objects T in the same area A, the processing module 34 generates a warning signal.

For a fourth example, when the containing body C is an indoor social space, and the target object T is the personnel, the indoor social space is distributed with a plurality of positioning label groups 20, and each positioning label group 20 divides each area A in the containing body C, wherein each area A is separated from another area A by an interval of 1.5 meters. Therein, when two or more target object T exist in the same area A, it means that two or more people violate a social distance regulation in the indoor space, so that the processing module 34 generates the warning signal, which is presented by sound or light for notifying the administrator of the indoor social space about the violation. With the foregoing configuration, advantages of the indoor positioning system 100 of the present invention will be illustrated below.

The positioning system 100 applies the positioning label groups 20 to define the containing body C into a plurality of positioning interfaces P. By reading the variation of the label signal relationship through the scanning device 30, the positioning system 100 identifies the position of the target object T according to the positioning interface P of it, achieving an efficient and accurate indoor positioning effect.

The positioning system 100 is prevented from being affected by building cover and interference of external signal, so as to achieve an accurate positioning effect.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An indoor positioning system for detecting a position of a target object located in a containing body, the system comprising:
   a tracking label disposed on the target object;
   a plurality of positioning label groups each disposed on the containing body, each positioning label group comprising a plurality of label units, each label unit defining a positioning interface, each positioning interface forming a plurality of areas of the containing body; and
   a scanning device sensing and reading the tracking label and each label unit of each positioning label group, the scanning device obtaining the positioning interface in which the tracking label is located through an analysis computation according to a signal relationship between the tracking label and each label unit, thereby identifying the positioning interface to obtain one of the areas of the containing body in which the target object is located;
   wherein the scanning device uses an energy of same transmission strength to sense the tracking label and each label unit of each positioning label group of different signal strengths through a second scanning technique;
   wherein the scanning device, in a concentric circle whose center is the tracking label, receives the signal strength of the label unit in a range of the concentric circle from the position of the target object, thereby detecting the position of the tracking label in the containing body.

2. The indoor positioning system of claim 1, wherein the scanning device comprises a sensing module, a memory module, and a processing module; the sensing module is applied for sensing and reading the tracking label and each label unit of each positioning label group; the memory module stores an amount of each label unit or the tracking label read by the sensing module each time which are recorded as a label amount; the processing module applies the analysis computation to carry out a deviation calculation of the label amounts currently recorded by the memory module and the label amounts previously recorded by the memory module, thereby obtaining one of the areas in which the target object is located.

3. The indoor positioning system of claim 2, wherein the scanning device comprises an information module for storing an exclusive information of the tracking label and each label unit; the processing module compares the sensed label and information in the information module, so as to confirm the amount of each label unit or the tracking label read each time.

4. The indoor positioning system of claim 1, wherein when the scanning device identifies a plurality of target objects in the same area, the scanning device generates a warning signal.

5. The indoor positioning system of claim 1, wherein the scanning device uses a plurality of energy of different transmission strengths to sense the tracking label and each label unit of each positioning label group of different signal strengths through a first scanning technique.

6. The indoor positioning system of claim 5, wherein the scanning device detects the position of the target object in the containing body from one position of the containing body through the first scanning technique.

7. The indoor positioning system of claim 1, wherein the tracking label and each label unit is an active member; the tracking label and the label unit continuously or intermittently emits a signal through a contact type energy input; the sensing module is an electromagnetic wave energy transmitter or receiver.

8. The indoor positioning system of claim 1, wherein the tracking label and each label unit is a passive member; the tracking label and the label unit continuously or intermittently emits a signal after a non-contact type external energy input; the sensing module is an electromagnetic wave energy transmitter or receiver.

* * * * *